United States Patent Office 3,850,987
Patented Nov. 26, 1974

3,850,987
COMPOUNDS USEFUL AS FEED SUPPLEMENTS
Frank R. Haglid, Wilmington, Del., assignor to E. I. du Pont de Nemours and Company, Wilmington, Del.
No Drawing. Original application Mar. 12, 1971, Ser. No. 123,848, now Patent No. 3,761,518. Divided and this application June 11, 1973, Ser. No. 369,115
Int. Cl. C07c 103/00
U.S. Cl. 260—561 S    2 Claims

ABSTRACT OF THE DISCLOSURE

This invention relates to 2-hydroxy-4-methyl-sulfinyl-butyric acid and salts, esters, and amides thereof, that can be incorporated in the diet of animals to increase feed efficiency.

Disclosed are methods for the preparation of the new sulfoxide compounds as well as feed compositions and feed concentrates containing them.

---

This is a division of application Ser. No. 123,848, filed Mar. 12, 1971, now U.S. Pat. No. 3,761,518.

BACKGROUND OF THE INVENTION

(1) Field of the Invention

The present invention relates to compounds that are useful in supplementing animal feeds that are marginally deficient in essential amino acids such as methionine. With such supplementation, feed utilization and general nutrition of the animals fed on such a diet is improved. It is well known to the art that a methionine deficiency results in subnormal growth in young animals and subnormal production of eggs, milk, haircoat, etc. in mature animals. Morevoer, whenever the productive performance of the animal is impaired by dietary deficiency of methionine there is a corresponding decrease in the efficiency of total diet utilization.

(2) Description of the Prior Art

It is known to the art that a methionine deficiency can be corrected by supplementing the animal diet with sufficient methionine to correct the deficiency. The closest prior art compounds are the sulfides that are the precursors to the sulfoxides of this invention. Although the precursor sulfide compounds are useful for supplementing the methionine deficiency in animal feed in general, the sulfide compounds have a distinctive odor and do not offer the advantages in formulating that the sulfoxides of this invention offer. The sulfoxides of this invention are miscible in any proportion with water, contrary to the precursor sulfide compounds, and therefore the formulative advantages are apparent.

SUMMARY OF THE INVENTION

The novel sulfoxide useful as an animal feed supplement is defined as a compound of the structure:

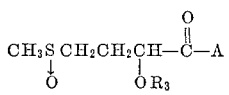

where
A is —OM or —NR$_1$R$_2$;
M is

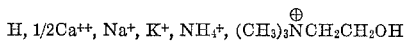

or an alkyl group of one to five carbon atoms;
R$_1$ and R$_2$ are H or an alkyl group of one to five carbon atoms;
R$_3$ is

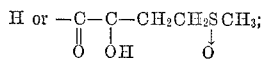

and when R$_3$ is

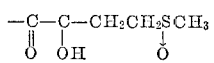

A is OM and M is an alkyl group of one to five carbon atoms.

The following compounds with reference to the above structure are preferred:
A is OM and M and R$_3$ are H,
A is OM with M being ½Ca$^{++}$ and R$_3$ is H, and
A is NH$_2$ with R$_3$ being H.

The chemical preparation process for this invention is defined as the process for preparing the above compounds which comprises titrating with hydrogen peroxide a sulfide of the structure:

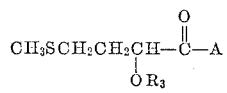

where
A is —OM or —NR$_1$R$_2$;
M is

or an alkyl group of one to five carbon atoms;
R$_1$ and R$_2$ are H or an alkyl group of one to five carbon atoms;
R$_3$ is

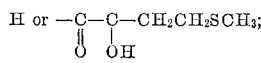

and when R$_3$ is

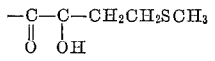

A is OM and M is an alkyl group of one to five carbon atoms;

thereby converting the sulfide to the corresponding sulfoxide. It is preferred that the hydrogen peroxide and the sulfide be in an aqueous solution and that the temperature of the reactants be within the range of about 20 to 30° C.

The animal feed of this invention comprises an effective amount of the above defined novel compounds in combination with an animal feedstuff to increase feed efficiency.

The feed concentrate of this invention comprises from about 1% to about 95% by weight of the above defined novel compounds in admixture with from about 99% to about 5% by weight of an edible diluent.

The method of use of this invention is defined as a method for increasing feed efficiency in animals which comprises orally administering to said animal from 0.05% to about 1% of the above defined novel compounds.

DESCRIPTION OF THE INVENTION

Hydrogen peroxide oxidation of 2-hydroxy-4-methyl-thiobutyric acid as well as of salts, esters and amides thereof yields the novel 2-hydroxy-4-methylsulfinylbutyric acid and its corresponding derivatives.

It is observed that animals utilize normal food rations more efficiently when the food ration is fortified with 2-hydroxy-4-methylsulfinylbutyric acid or physiologically acceptable salts, esters or amides thereof, hereinafter referred to as the sulfoxides of this invention. This increase in the utilization of the food ration is referred to herein as increased feed efficiency.

These sulfoxides are, therefore, useful as supplements in protein- and/or methionine-deficient foods. The sulfoxides are particularly useful as supplements in conventional low-cost animal feedstuffs such as corn meal or other grains. The use of these sulfoxides to supplement such feedstuffs provides an available source of methionine in the diet and at the same time conserves the available protein in the feed for improved utilization of said protein.

It has now been discovered that the sulfoxides of this invention can be used as a dietary substitute for methionine. Therefore, these sulfoxides can generally be employed to supplement protein or methionine deficient foodstuffs. The sulfoxides of this invention possess several valuable properties that make them superior as feed additives. They are completely void of obnoxious odor and taste and are therefore extremely well tolerated as feed additives by the animals.

The sulfoxides are highly water soluble with most of them being miscible with water in any proportion. Water solubility provides two important advantages: (1) Impurities normally present in the starting materials are easily removed from the concentrated aqueous sulfoxide solutions by mere filtration resulting in products of high purity. (2) The high water solubility facilitates the mixing of the feed to high homogeneity and gives better accuracy in dosage. These sulfoxides can themselves be incorporated into animal feeds or can be admixed with other dietary supplements as a feed concentrate to be incorporated into a feed ration. Descriptions of suitable feeds and feed concentrates can be found in the book "Feeds and Feeding" by Frank B. Morrison, published by the Morrison Publishing Company of Ithaca, New York, 1948, 21st edition. The selection of the particular feed is within the knowledge of the art and will depend of course on the animal, the economics, natural materials available, the surrounding circumstances and the nature of the effect desired, as will be readily understood. Not only can the individual sulfoxides be used but also their mixtures such as mixtures of the various salts exemplified below or mixtures of esters of various alcohols. Furthermore, the high water solubility and lack of obnoxious odor and taste allow the sulfoxides of this invention to be administered to the animals by mixing in their drinking water or in liquid foods such as milk.

It will be understood that the feed compositions of this invention are comprised of conventional animal feedstuff fortified with from 0.05 to 1.0% by weight of the sulfoxides of this invention. Within this range, for best feed utilization, it is preferred that poultry feed compositions will contain from 0.05 to 0.2% by weight of the sulfoxide on the basis of the finished feed. In preparing feed rations for animals such as dairy cattle and sheep, it will often be preferred that the finished feed contain from 0.5 to 1% by weight of the sulfoxide. The particular concentration of sulfoxide in the finished feed will depend on the naturally available methionine in the feedstuff, and, of course, on the age and condition of the animal being fed.

A particularly important composition according to this feature of the invention is a concentrate, suitable for preparation and sale to a farmer or livestock grower for addition to animal feedstuffs in an appropriate amount. These concentrates ordinarily comprise about 1% to about 95% by weight of a sulfoxide of this invention together with a diluent. Generally the diluent will consist either of water or of a solid such as ground corn, ground wheat, ground barley, ground oats, wheat bran, soybean oil meal, cottonseed meal, linseed meal, cottonseed hulls and the like.

The feed compositions, as well as the above-described concentrates, can additionally contain other components of feed concentrates on animal feeds, as will be readily understood. Other particularly important additives include proteins, carbohydrates, fats, vitamins, minerals, antibiotics, etc.

Although the disclosure of this invention is primarily directed to the method of increasing feed efficiency of economically important farm animals, it will be understood and apparent to those skilled in the art that the sulfoxides of this invention can be used to increase the feed efficiency of any animal that can be benefited by the inclusion of a dietary source of methionine in its feed ration. For example, these sulfoxides can be incorporated in the feed of puppies to improve feed utilization and as a result to increase growth rate. The sulfoxides can be incorporated in the feed of mature dogs to improve the haircoat. The sulfoxides can also be incorporated in fish food to increase body weight yield in fish farming.

The following examples are presented to further illustrate the invention.

EXAMPLES

Preparation procedures.—The sulfoxide derivatives of 2-hydroxy-4-methylsulfinylbutyric acid can be prepared by hydrogen peroxide oxidation of the corresponding sulfides that are known compounds. U.S. Pat. 2,745,745 that issued May 15, 1956, teaches preparation of the following precursors: the acid, the ammonium salt of the acid, alkali metal salts, and the amides. The preparation of the ester precursors are taught in German Pat. 1,063,443 (1958) and in Examples 9–12 following.

Example 1

To a solution of 10 parts 2-hydroxy-4-methylthiobutyric acid in 20 parts water is added dropwise 7.6 parts 30% hydrogen peroxide at 20 to 30° C. After 3 hours the water is removed by distillation under reduced pressure leaving 2-hydroxy-4-methylsulfinylbutyric acid as an oil.

Example 2

To a suspension of 10 parts 2-hydroxy-4-methylthiobutyric acid hemicalcium salt in 25 parts water is added dropwise 6.7 parts 30% hydrogen peroxide at 20 to 30° C. Solution occurs rapidly and minor amounts of solid impurities usually present in the starting material are removed by filtration. The resulting clear, colorless solution is then stripped under reduced pressure and 200 parts acetone is added to the residue to yield a gummy precipitate. The precipitate is separated, dissolved in 40 parts methanol and the solution added to 250 parts acetone with rapid stirring. The resulting solid is filtered and dried to yield 2-hydroxy - 4 - methylsulfinylbutyric acid hemicalcium salt, dihydrate, that is slightly hygroscopic and sinters at around 180° C.

Example 3

The calcium salt of Example 2 may alternatively be prepared by neutralization of the acid of Example 1 with calcium hydroxide.

Examples 4–7

The following salts can be synthesized by the method of Example 3 substituting the appropriate base for calcium hydroxide.

| Example | Base | 2-hydroxy-4-methyl-sulfinylbutyric acid salt |
|---------|------|----------------------------------------------|
| 4 | Sodium hydroxide | Sodium. |
| 5 | Potassium hydroxide | Potassium. |
| 6 | Ammonium hydroxide | Ammonium. |
| 7 | Choline hydroxide | Choline. |

Example 8

To a stirred suspension of 50 parts 2-hydroxy-4-methylthiobutyric acid hemicalcium salt in 150 parts ethanol is added hydrogen chloride gas. The temperature rises and solution occurs. After refluxing for 30 minutes, the reaction mixture is cooled and poured on 400 parts of ice. From the resulting mixture the product is extracted with chloroform, the extract is then dried and distilled to yield 2-hydroxy-4-methylthiobutyric acid ethyl ester (boiling point 87–93° C. at 0.4 mm. of Hg pressure).

To 10 parts of above ester is added slowly while stirring 6.4 parts 30% hydrogen peroxide at 20–30° C. Solution occurs rapidly and water is then removed under reduced pressure. To remove the final traces of water, benzene is added and stripped 2 to 3 times leaving 2-hydroxy-4-methylsulfinylbutyric acid ethyl ester as an oil.

Examples 9–12

The following esters can be synthesized by the method of Example 8 substituting the appropriate alcohol for ethanol.

| Example | Alcohol | 2-hydroxy-4-methyl-sulfinylbutyric acid ester |
|---|---|---|
| 9 | Methanol | Methyl. |
| 10 | 2-propanol | 2-propyl. |
| 11 | 1-butanol | Butyl. |
| 12 | 3-methylbutanol | 3-methylbutyl. |

Example 13

Ten parts 2-hydroxy-4-methylthiobutyric acid ethyl ester and 0.1 part sodium methoxide are heated at atmospheric pressure until ethanol begins distilling off, which occurs at a pot temperature of 170–180° C. At the end of ethanol evolution the residue is fractionally distilled yielding 2-(2'-hydroxy-4'-methylthiobutyroyloxy)-4-methylthiobutyric acid ethyl ester (boiling point 165–170° C. at 0.2 mm. Hg pressure).

Five parts of above ester are stirred while 3.5 parts 30% hydrogen peroxide are slowly added. Solution occurs rapidly. After 3 hours standing at room temperature water is removed under reduced pressure. The final traces of water are removed with benzene as described in Example 8 to yield 2-(2'-hydroxy-4'-methylsulfinylbutyroyloxy)-4-methylsulfinylbutyric acid ethyl ester as an oil.

Examples 14–17

The following esters can be synthesized by the method of Example 13 substituting the appropriate ester for the ethyl ester used.

| Example: | 2-(2'-hydroxy-4'-methylsulfinylbutyroyloxy)-4-methylsulfinylbutyric acid ester |
|---|---|
| 14 | Methyl |
| 15 | Propyl |
| 16 | 2-butyl |
| 17 | Pentyl |

Example 18

To a suspension of 15 parts 2-hydroxy-4-methylthiobutyramide in 30 parts water is added dropwise while stirring 11.4 parts 30% hydrogen peroxide. Solution occurs rapidly and water is then removed by distillation under reduced pressure. The residue is made to crystallize from acetonitrile to yield 2-hydroxy-4-methylsulfinylbutyramide (melting point 105–107° C.).

Example 19

A mixture of 10 parts 2-hydroxy-4-methylthiobutyric acid ethyl ester (Example 8) and 30 parts dibutylamine are heated to 150–160° C. for 24 hours. Amine and ethanol formed in the reaction are then removed under reduced pressure leaving 2-hydroxy-4-methylthiobutyryl dibutylamide as a viscous oil.

The above amide is oxidized as described in Example 18 to yield 2-hydroxy-4-methylsulfinylbutyryl dibutylamide as an oil.

Examples 20–24

The following amides can be synthesized by the method of Example 19 substituting the appropriate amine for dibutylamine. When low boiling amines are used the experiment is performed in a steel bomb.

| Example | Amine | 2-hydroxy-4-methyl-sulfinylbutyryl amide |
|---|---|---|
| 20 | Methylamine | Methyl. |
| 21 | Dimethylamine | Dimethyl. |
| 22 | Ethylmethylamine | Ethylmethyl. |
| 23 | Butylamine | Butyl. |
| 24 | Butylmethylamine | Butylmethyl. |

Example 25

A poultry premix of the following formula can be prepared to be used at a rate of 5 lbs. per ton of finished feed.

| Ingredient: | Parts by weight |
|---|---|
| Vitamin $B_{12}$ (6 mg./lb.) | 6.95 |
| Vitamine E acetate (20,000 I.u./lb.) | 9.40 |
| Vitamin A (30-A) | 1.47 |
| Antioxidant (BHT) | 1.25 |
| Ascorbic acid | 0.50 |
| Niacin | 0.25 |
| Folic acid (10%) | 0.05 |
| Calcium pantothenate | 0.04 |
| Pyridoxine hydrochloride | 0.02 |
| Riboflavin | 0.02 |
| Menadione sodium bisulfite | 0.02 |
| Vitamin $D_3$ supplement | 0.02 |
| Thiamin mononitrate | 0.01 |
| Biotin | 0.02 |
| Sulfoxide of Example 1 | 5.00 |
| | 25.02 |

Similarly, premixes can be prepared by substituting any of the sulfoxides of Example 2, 7, 8, 13, 18, or 20 for the sulfoxide of Example 1.

Example 26

A poultry feed of the following formula can be prepared.

| Ingredient: | Lbs./ton |
|---|---|
| Ground yellow corn | 1226 |
| Stabilized fat | 110 |
| De-hulled soybean meal | 400 |
| Menhaden fish meal | 150 |
| Corn gluten meal | 72 |
| Defluorinated phosphate | 20 |
| Ground limestone | 6 |
| Salt | 9 |
| Vitamin and mineral premix | 6 |
| Sulfoxide of Example 1 | 1 |
| | 2000 |

Similarly, any of the sulfoxides of Example 6, 11, 15, 18, or 23 can be substituted for the sulfoxide of Example 1.

Growing chicks are fed the ration of Example 26 and thereafter exhibit a 5%–10% increase in growth to maturity compared to a control group being fed a similar ration without the sulfoxide of this invention.

Example 27

A poultry feed of the following formula can be prepared.

| Ingredient: | Lbs./ton |
|---|---|
| Ground yellow corn | 1190 |
| Stabilized fat | 110 |
| Soybean meal | 550 |
| Corn gluten meal | 70 |
| Defluorinated phosphate | 45 |
| Ground limestone | 16 |
| Salt | 10 |
| Vitamin and mineral premix | 6 |
| Sulfoxide of Example 2 | 3 |
| | 2000 |

Similarly, any of the sulfoxides of Example 7, 9, 13, or 19 can be substituted for the sulfoxide of Example 2.

A flock of laying hens, maintained for egg production, are provided 20% less of the food ration of Example 27 per dozen eggs than a similar control flock being fed a similar ration not containing a sulfoxide of this invention.

Example 28

A cattle premix of the following formula can be prepared to be used at a rate of about 200 lbs./ton of finished feed.

| Ingredient: | Parts by weight |
|---|---|
| Salt, iodized | 36 |
| Vitamin A and D mix | 20 |
| Trace mineral mix | 4 |
| Soy mill feed | 100 |
| Sulfoxide of Example 1 | 40 |
| | 200 |

Similarly, any of the sulfoxides of Example 8, 13, or 18 can be substituted for the sulfoxide of Example 1.

Example 29

A cattle supplement of the following formula can be prepared.

| Ingredient: | Parts by weight |
|---|---|
| Soybean meal | 1200 |
| Cane molasses | 280 |
| Dehydrated alfalfa meal | 280 |
| Dicalcium phosphate | 104 |
| Salt, iodized | 36 |
| Sulfoxide of Example 18 | 100 |
| | 2000 |

Similarly, any of the sulfoxides of Example 2, 10 or 23 can be substituted for the sulfoxide of Example 18.

Example 30

A cattle supplement of the following formula can be prepared.

| Ingredient: | Parts by weight |
|---|---|
| Cane molasses | 250 |
| Dehydrated alfalfa meal | 850 |
| Urea | 430 |
| Dicalcium phosphate | 200 |
| Salt, iodized | 70 |
| Sulfoxide of Example 13 | 200 |
| | 2000 |

Example 31

A complete dairy ration of the following formula can be prepared.

| Ingredient: | Lbs./ton |
|---|---|
| Soybean oil meal | 100 |
| Wheat bran | 200 |
| Wheat middlings | 400 |
| Corn gluten feed | 200 |
| Dried brewers grains | 50 |
| Corn distillers grains | 100 |
| Hominy feed | 678 |
| Molasses | 160 |
| Calcium carbonate | 20 |
| Dicalcium phosphate | 10 |
| Urea | 40 |
| Salt | 20 |
| Vitamin A and D and trace mineral mix | 2 |
| Sulfoxide of Example 6 | 20 |
| | 2000 |

Dairy cattle are maintained on the feed ration of Example 31 with an increase in milk and milk fat production during early lactation over cattle being fed an equivalent amount of a similar ration not containing a sulfoxide of this invention.

What is claimed is:

1. A compound of the structure

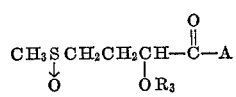

where
A is $-MR_1R_2$;
$R_1$ and $R_2$ are H or an alkyl group of one to five carbon atoms;
$R_3$ is H.

2. The compound of Claim 1 wherein A is $NH_2$ and $R_3$ is H

References Cited

UNITED STATES PATENTS

| 2,745,745 | 5/1956 | Blake et al. | 260—561 SX |
| 2,938,053 | 5/1960 | Blake et al. | 260—561 S |

FOREIGN PATENTS

| 7,066 | 3/1964 | Japan | 260—561 S |

LEWIS GOTTS, Primary Examiner

E. G. LOVE, Assistant Examiner

PO-1050
(5/69)

UNITED STATES PATENT OFFICE
CERTIFICATE OF CORRECTION

Patent No. 3,850,987    Dated November 26, 1974

Inventor(s) Frank R. Haglid

It is certified that error appears in the above-identified patent and that said Letters Patent are hereby corrected as shown below:

Definition of A in column 8, line 34, reading:

"A is $-MR_1R_2$"; should read

"A is $-NR_1R_2$";

Signed and sealed this 29th day of April 1975.

(SEAL)
Attest:

RUTH C. MASON
Attesting Officer

C. MARSHALL DANN
Commissioner of Patents
and Trademarks